United States Patent [19]
Nye et al.

[11] 3,820,666
[45] June 28, 1974

[54] APPARATUS FOR PICKING UP AND TRANSFERRING LIGHT ARTICLES

[76] Inventors: Norman H Nye, 1348 Highbridge Rd., Cuyahoga Falls, Ohio 44223; Arthur T. Medkeff, 260 Fawnwood Dr., Tallmadge, Ohio 44278

[22] Filed: June 29, 1972

[21] Appl. No.: 267,701

[52] U.S. Cl. ................ 214/1 BV, 198/25, 221/211
[51] Int. Cl. .............................................. B66 1/02
[58] Field of Search ............ 214/1 BV; 198/210, 25; 221/9, 13, 211; 133/8 R, 8 A, 8 B, 8 D, 8 E

[56] References Cited
UNITED STATES PATENTS

| | | | |
|---|---|---|---|
| 3,033,418 | 5/1962 | Hollopetre | 221/13 |
| 3,045,864 | 7/1962 | Hurst | 221/13 X |
| 3,240,175 | 3/1966 | Clow | 221/211 X |
| 3,253,719 | 5/1966 | Povlacs | 214/1 BV |
| 3,616,942 | 11/1971 | Gruber | 198/210 X |

*Primary Examiner*—Albert J. Makay
*Assistant Examiner*—George F. Abraham
*Attorney, Agent, or Firm*—Oldham & Oldham

[57] ABSTRACT

Apparatus and method for picking up, transferring and depositing light flexible articles. The apparatus includes a driven rotary member having a plurality of tubular arms extending from circumferentially spaced portions of the member. The ends of these arms pass through a portion of a receptacle in which the articles are stored and suction is set up on these arms at their ends as moved through the receptacle to attract articles thereto. An air discharge blast is provided in the arms when the articles are to be released.

5 Claims, 6 Drawing Figures

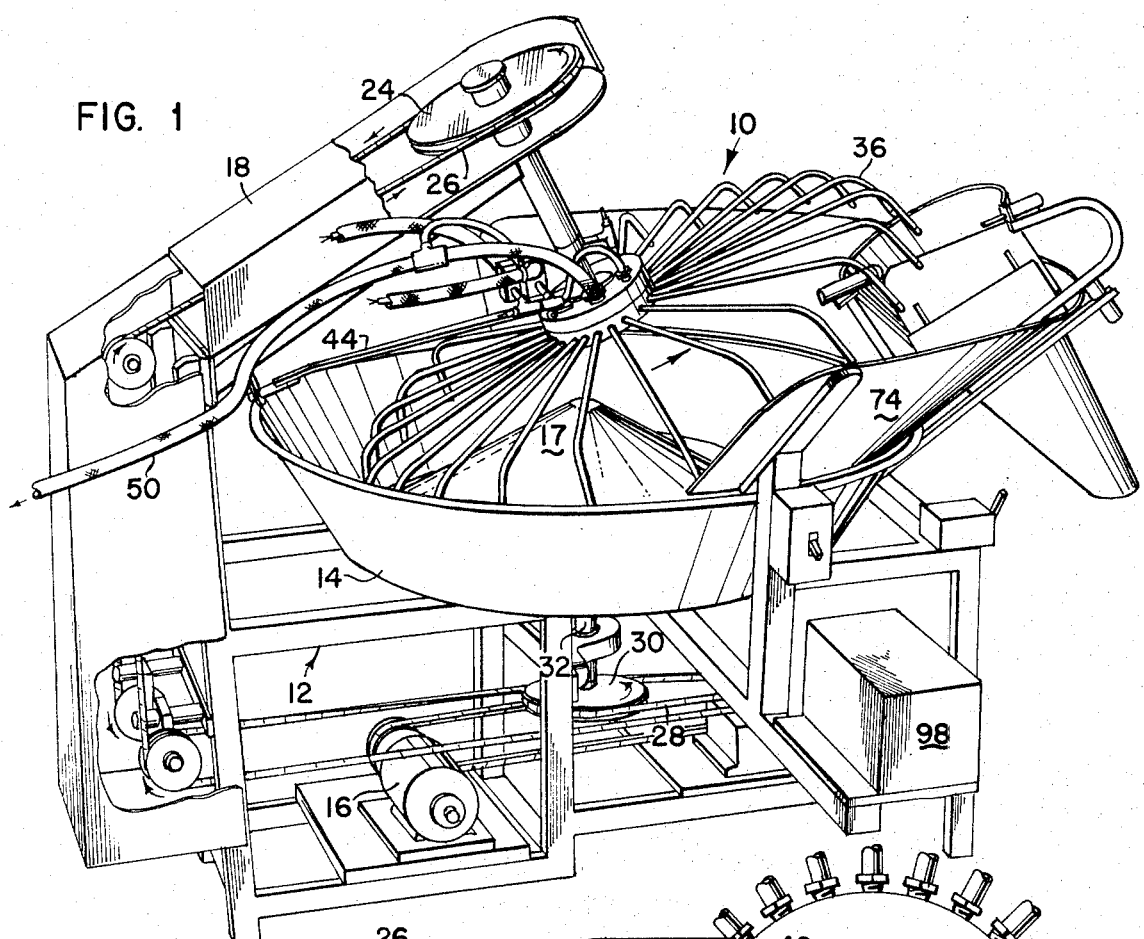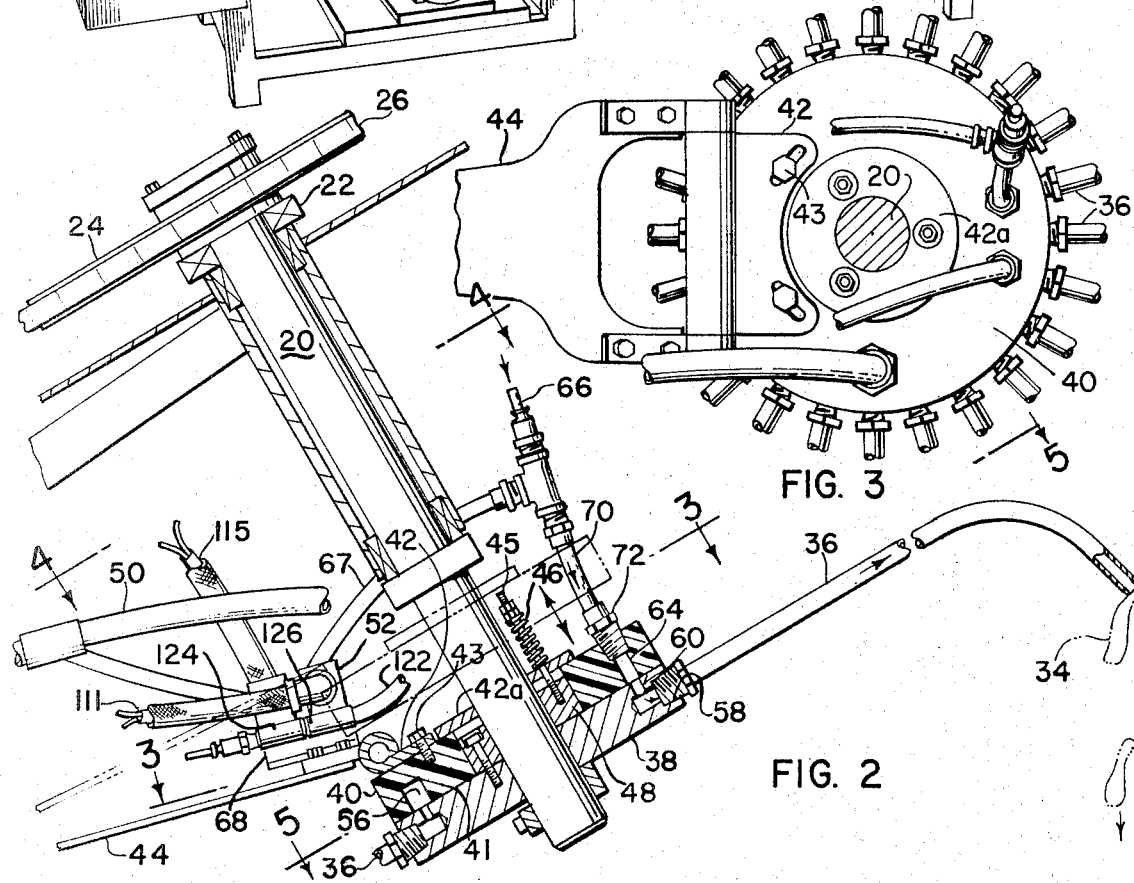

3,820,666

APPARATUS FOR PICKING UP AND TRANSFERRING LIGHT ARTICLES

Heretofore there have been various types of apparatus provided for picking up, transferring and depositing light articles, but all of such apparatus, insofar as we are aware, has been relatively bulky, cumbersome and/or expensive apparatus. Or, the prior apparatus has not been especially adapted for depositing a predetermined number of articles into a container therefor, or the apparatus may have been objectionable for one or more other reasons.

The general object of the present invention is to provide a novel and improved apparatus and method for picking up, transporting and depositing lightweight articles, especially to the deposit of a predetermined number of articles into a positioned container.

Another object of the invention is to provide a low cost, low maintenance apparatus for continuously picking up and depositing relatively large numbers of small, flexible, lightweight articles by taking them from a storage compartment to a packaging area or container.

Another object of the invention is to successively apply suction to a plurality of pick-up arms carried by a rotary member and which suction is applied for one portion of the circumferential path of the arms after which a discharge blast can be applied to the arms at a predetermined deposit area or at a return spot for the articles to free the arms for their next pick-up action.

Yet another object of the invention is to provide a novel distributor manifold in association with a rotary member for controlling the application of suctional and/or air discharge forces thereto.

The foregoing and other objects of the invention will be made more apparent as the invention proceeds.

Attention now is particularly directed to the accompanying drawings wherein:

FIG. 1 is a perspective view of apparatus embodying the principles of the invention;

FIG. 2 is a fragmentary, vertical section of the rotary member, pick-up arms and associated means in the apparatus;

FIG. 3 is a fragmentary sectional view taken on line 3—3 of FIG. 2;

When referring to corresponding members shown in the drawings and referred to in the specification, corresponding numerals are used to facilitate comparison therebetween.

SUBJECT MATTER OF THE INVENTION

Figure 4:
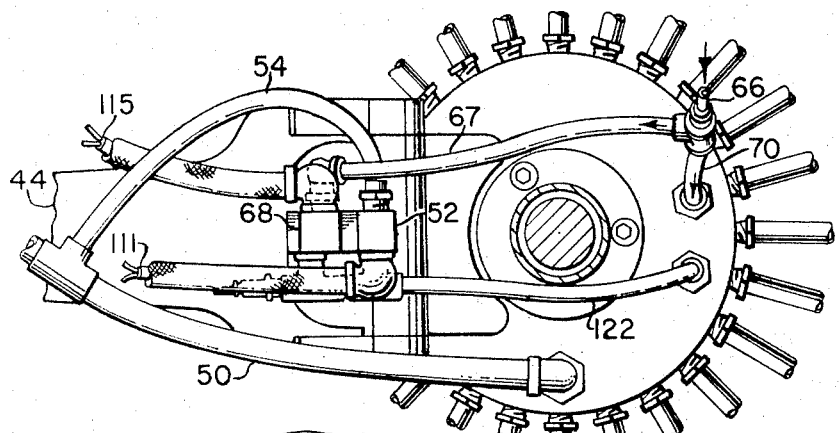
FIG. 4 is a fragmentary section taken on line 4—4 of FIG. 2.

The apparatus of the invention is adapted to pick up light, flexible articles and transfer them to a different spot for discharge. It includes an opened topped receptacle for the articles, a driven rotary member, a plurality of tubular arms extending from circumferentially spaced portions of the rotary member and having ends positioned to pass through a portion of the receptacle in one arcuate part of their rotary movement, means for setting up suction on the arms as their ends are moved through the receptacle to attract articles thereto and carry them thereon, and means for providing an air discharge stream to the ends of the arms in another portion of their rotary movement whereby the articles carried by the arms are positively discharged therefrom. The method of pick-up, transfer and discharge also is a portion of the invention.

Attention now is particularly directed to the details of the structure shown in the accompanying drawings, and article pick-up, transfer and discharge apparatus is indicated as a whole by the numeral 10. This apparatus 10 includes a frame 12, an open topped relatively wide receptacle 14 carried on the frame 12 and usually a drive member, such as a motor 16. The receptacle 14 is shown to include a substantially conical shaped center section 17 which is rotated when the apparatus is in operation, as hereinafter described in more detail.

The frame also includes an upwardly angled support arm or means 18 that suitably journals a support shaft 20 thereon to extend downwardly therefrom, usually normally to a plane defined by the support arm 18. FIG. 2 indicates that this support arm 20 can be journalled in any suitable bracket or positioning means 22 carried by the support 18 and extending downwardly therefrom. The support arm 20, being rotatably mounted, connects by any conventional means such as a drive wheel or sheave 24 to a belt 26 that operatively connects to the drive motor 16 by any known type of a drive system, such as a speed reducer, belt and the like. One belt 28 in the drive system extends to a drive pulley or sheave 30 secured to a shaft 32 extending up to and supporting the center section 17 of the receptacle whereby such shaft rotates the center section of the receptacle when the apparatus is in use.

The receptacle 14 is adapted to receive a plurality of any type of a small flexible article, such as gloves, or balloons 34, shown in the receptacle and these articles can be dropped or deposited manually thereinto or be otherwise positioned therein as desired. In order to provide the article pick-up and delivery action in the apparatus 10, a plurality of support or carrier arms 36 are provided. These carrier arms 36 are secured to a rotary carrier plate 38 operatively secured to the lower end of the support arm 20.

As an important feature of the invention, a manifold or control disc, plate, or means 40 is fixedly positioned to abut on a face of the carrier plate or disc 38, as shown in FIG. 2. The discs or plates 38 and 40 and means associated therewith control supply of pick-up suction or a discharge air stream to the carrier arms 36. The control plate or disc 40 is secured to and positioned by an end plate 42 by cap screws 43. The end or support plate 42 is pivotally secured to a support bar 44 that is attached to a portion of the support means 18 or the frame 12. Such control plate or disc 40 is resiliently urged into rotatable engagement with the carrier disc 38 as by members such as studs 45 operatively secured to the carrier disc 38 and extending through a plate 42a but having springs 46 surrounding such studs and pressing the plate 42a against the disc 40 to urge the discs 38 and 40 into airtight engagement with each other. These discs normally are of the same outer diameter and have flat faces or side surfaces engaging each other. Usually the stationary control disc 40 is made from a suitable plastic material, such as nylon or the like, and it has a center bore of a larger diameter than the companion carrier disc 38. A center hub 48 is secured to the carrier disc and it extends therefrom to rotatably engage with and position the control disc 40 to retain the two members in operative engagement for relative rotation therebetween. The studs 45 engage such hub 48. The end plate 42 bears on the carrier disc and is retained in pressure engagement with the disc 40 by the studs 44 and associated means. Hence, relative rotation can occur between the discs 38 and 40 but yet a substantially airtight connection is provided therebetween. This is an important element of the present invention in that controllable suction and discharge forces can be provided for the arms 36 by means on the control disc 40 and be transmitted to the rotary carrier disc 38.

The apparatus of the invention includes a vacuum supply line or tube 50 which connects to an elongate circumferentially extending arcuate slot 56 provided in a radially outer section of the carrier disc 38. The line 50 also connects to a solenoid control valve 52 by a line 54. This slot 56 is formed in the side face 41 of the control disc 40 adjacent the carrier disc 38. The carrier disc 38 has a plurality of radially extending end recesses or bores 58 in which ends of the carrier arms 36 are received for air or vacuum flow thereto. Each one of these ends or sockets may have any suitable fitting therein and each has a bore 60 connecting to the face of the carrier disc abutting on the face or side 41 of the control disc 40, as shown in FIG. 2. Vacuum forces are provided to the slot 56 at all times for article pick-up and transfer action by the carrier arms 36 connecting thereto.

For additional control functions, two circumferentially spaced, independent, arcuate slots 62 and 64 are formed in the face 41 of the control disc 40 at progressively further downstream portions thereof. These slots are adapted to register with the various connector bores 60 provided in the carrier disc face 38 as it rotates. Hence, different forces as hereinafter described can be transmitted from the control disc 40 to the individual arms on the carrier disc 38 depending upon which ones of the slots 56, 62 or 64 is then engaged with a specific one of the connector bores 60 provided in the carrier disc and connecting to the individual support arms in the apparatus to control the article carrying action thereof.

A tube or line 66 also connects the apparatus of the invention to a suitable source, not shown, of air pressure. Pressure supplied through the line 66 flows through a line 67 to a second control solenoid valve 68. These solenoid valves 52 and 68 are alternately energized to control article discharge action. A distributor line or tube 70 extends from a fitting in the line 66 to the slot 64 in the control disc 40. A fitting 72 extends axially through the control disc to transmit air pressure through the bore 60 for any tube 36 at that time positioned circumferentially so as to engage the slot 64. Hence, air pressure supplied by the tube 70 to the bore 60 will blow off any light, flexible article engaged by an individual arm 36a and 36b extending from or connecting to this recess or slot 64.

Figure 5:
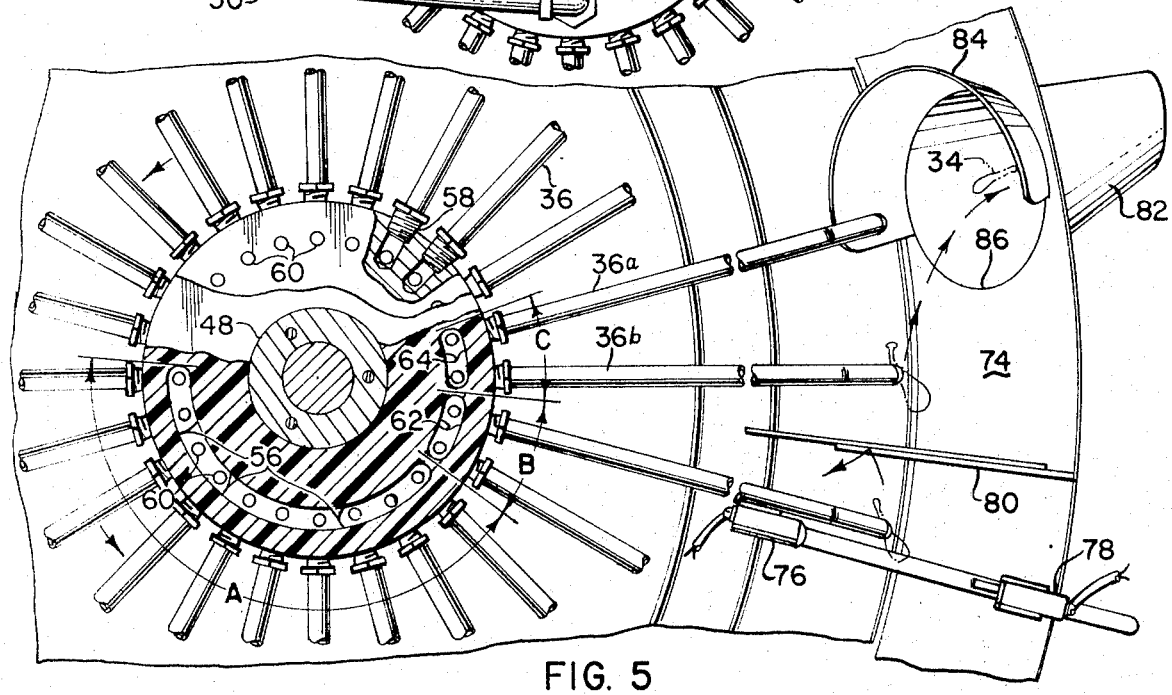
FIG. 5 is a fragmentary section taken on line 5—5 of FIG. 2.

FIG. 5 of the drawings clearly shows that a plurality of bores 60,60 connect to the individual fittings or bores 58 by which the individual support arms are positioned in the circumferentially spaced portions of the control disc 40. The various recesses or slots 56, 62 or 64 provided in the control disc 40 will successively engage the support arms as the carrier 38 rotates. Each individual support arm has its connecting bore 60 extending to the face of the carrier disc 38 adjacent the control disc 40 where a substantially airtight rotary seal is formed between the two discs for regulating the pick-up, transfer and deposit action of the individual support arms in the apparatus.

As a further feature of the invention, the apparatus is adapted to deposit a predetermined number of the transferred articles into a receptacle at the discharge area or zone provided. Thus, FIGS. 1 and 5 show that the receptacle 14 has an extension or guard 74 provided thereon and extending for a reasonable arcuate length of the apparatus at the portion thereof wherein the support arms 36 move up out of the receptacle.

The drawings clearly show that the support arms 36 are positioned in the apparatus as to rotate through a plane inclined to the horizontal so that a portion of the plane is extended above the top of the receptacle 14. Thus, ends of the support arms 36 extend through an area which is adjacent the periphery of or even slightly radially beyond the margins of the receptacle 14. In this discharge zone of the apparatus, a photoelectric cell or eye 76 is suitably secured to an upper edge of the guard or associated means and it has a light beam directed thereat by a light or lamp 78 with suitable leads connecting to both the cell 76 and the light 78. A baffle member 80 is carried by an upper portion of the receptacle 14 and/or the guard 74 thereon so that articles dropped off or forced from the support arms 36 would strike such baffle and fall back into the container or receptacle 14 if discharged in advance of the final discharge zone of the apparatus. Such discharge zone of the apparatus is located downstream from both the photoelectric cell 76 and the baffle 80 and it includes a downwardly extending hopper 82 that has an arcuately shaped upwardly extending guide 84 provided on the guard 74 on the downstream section of the substantially cylindrical hopper 82. This guide 84 is provided at a hole 86 formed in the guard 74 and to which the dependent hopper 82 connects whereby the depositing of articles into the hopper is facilitated. Naturally, any suitable receptacle, shipping box, or the like (not shown) can be positioned underneath the lower end of the hopper 82 for collecting a plurality of the articles therein.

Figure 6:
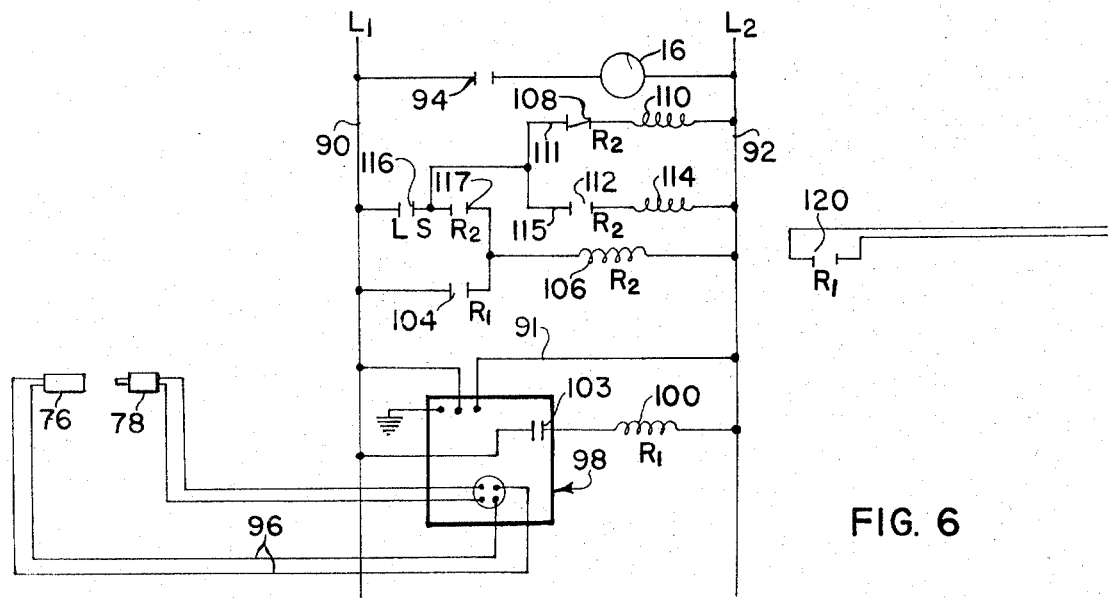
FIG. 6 is a diagrammatic view of the electrical wiring system of the apparatus of the invention.

FIG. 6 shows a schematic drawing of the electrical control circuit for the apparatus of the invention and a pair of power leads 90 and 92 are provided. The motor 16 has a starting switch 94 provided in the circuit therefor by which this apparatus can be started and stopped, as desired.

A counting action is provided by the photoelectric cell 76 and the beam supplied thereto by the light 78, which beam is interrupted when an arm 36 swings by between these two members and with the arm having one of the flexible, lightweight articles thereon. Such actuations from the photoelectric cell are transmitted through wires 96 to a standard counter mechanism 98. This counter mechanism is energized from the leads 90 and 92 by leads 91 and it is connected to the operating coil 100 of a conventional relay $R_1$. The counter can be preset to close a normally open switch 103 therein when the preset number of actuations has been received. This relay $R_1$, when momentarily closed by the counter mechanism 98, will close a normally open circuit through a pair of contacts 104 and energize the coil 106 for a second relay $R_2$ provided in the apparatus. This relay $R_2$ is adapted to control the functioning of the solenoid valves 52 and 68 referred to hereinbefore. Thus, a set of normally closed contacts, or switch 108 closes an operating circuit for the actuating coil 110 of the solenoid valve 52 when the relay $R_2$ is deenergized. But when such relay is energized, then such contacts 108 are opened and another switch or set of contacts 112 are closed to energize a coil 114 for the normally unenergized solenoid valve 68. This action controls supply of suctional forces and discharge air to the different support arms in their various positions of arcuate movement in the pick-up, transfer and deposit action provided by the apparatus of the invention. A normally closed limit switch 116 is provided in series with a switch or contacts 117, which contacts are closed when the relay $R_2$ is energized to retain such energization until the limit switch is opened.

The counter mechanism 98 is provided so that when a predetermined number, such as 12, flexible articles have been carried past the photo cell 76 by arms 36, then the counter mechanism is energized to actuate the relay $R_1$ and close a pair of contacts 120 provided in a separate circuit. Such circuit can be present in the packaging machine used in association with the apparatus for correlation of the packaging action with action of the apparatus of the invention.

The limit switch 116 in the control circuit can, for example, be associated with and be closed by the package to be filled by articles deposited through the hopper 82. Hence, when such container is removed, manually or otherwise, then the limit switch 116 would be opened and this would terminate actuation of the solenoid valve 68 and of the operative coil 106 for $R_2$. Placing another container in position would close the circuit and actuate the coil 110 for the solenoid valve 52. Thus, the energization circuit for the apparatus would return to its normal operating condition in which suction is applied to the carrier arms 36 as they move through the arcs A and B as shown in FIG. 5. Air for blowing off the articles being transported then is only provided through the arms engaging the slot or recess 64 for the arc C as shown in FIG. 5 but when articles are not required at the discharge area or guide 84 they are blown off in arc B to return to the receptacle 14.

Suction is provided to the arms 36 at all times as they move through the arc A, FIG. 5, in the relative rotary movement of the carrier disc 38 in the apparatus. Likewise, at all times, a discharge air blast is provided to the arms as they move through the arc C whereby articles are always discharged from the arms prior to the arms moving back down into the container 14 in which the articles to be transported are positioned.

All that is required to change the operative conditions in the system of the invention is to have the coil 110 for the solenoid valve 52 deenergized from its normal energized position and have the operating coil 114 for the air supply or control solenoid valve 68 actuated. This changes the conditions existing in the supply slot 62 from a vacuum article retentative condition over to an air blast or article discharge condition, depending upon where the articles are to be released. The openings 37 at the ends of the arms 36 are of any suitable size and the air pressure and vacuum forces furnished to the apparatus are suitable to effect the pick-up and discharge action required in the apparatus.

Leads 111 and 115 connect to the solenoid valves 52 and 68 to control operation thereof.

The speed of rotation of the shaft 20 and carrier arms 36 normally is different from the rotational speed of the center 17 of the receptacle 14.

Vacuum is transmitted from the solenoid control valve 52 to the slot or recess 62 by a tube 122 when the valve 52 is energized. However, when the solenoid valve 68 is energized and the valve 52 is deenergized, compressed air from the valve 68 flows through a fitting 124 to connect to a fitting 126 on the valve 52 and through it to the slot 62.

Of course, any suitable number of articles can be counted by the counter 98 for controlling the automatic packaging, counting or grouping action by the apparatus and method of the invention.

The counting mechanism 98 can be disconnected or shut off as desired. Then the articles picked up would be discharged in the arc C and dropped into the hopper or chute 82.

The apparatus of the invention is relatively uncomplicated and will operate with a minimum of maintenance. The electrical controls provided will change the discharge air circuit in relation to the holding vacuum circuit for a portion of the arcuate movement of the carrier arms 36 to regulate article deposit. Thus, it is believed that the objects of the invention have been achieved.

While one complete embodiment of the invention has been disclosed herein, it will be appreciated that modification of this particular embodiment of the invention may be resorted to without departing from the scope of the invention.

What is claimed is:

1. Apparatus for picking up and transferring light articles comprising an open topped receptacle for the articles, a frame, a support arm extending upwardly from said frame, a support shaft, said support shaft being mounted on said support arm and extending downwardly towards the receptacle, a driven rotary carrier plate attached to said support shaft, a plurality of tubular arms extending from circumferentially spaced portions of said carrier plate and with their ends being positioned for passing through a portion of said receptacle in one part of their rotary movement, said rotary member with said tubular arms thereon being positioned above said receptacle, a stationary manifold disc extending about said support shaft and having an axial face, said axial face abuttingly engaging said rotary plate, a support bar connected to said frame and pivotally attached to said manifold, a suction supply attached to said manifold and an air pressure supply attached to another portion of said manifold so that as said carrier plate rotates, said arm ends are successively supplied with vacuum to carry an article thereby and then with air pressure to positively discharge the article thereby.

2. Apparatus as in claim 1 where said support shaft is so positioned so that said rotary member is positioned to move said arms into said receptacle and then upwardly out of and above said receptacle and said discharge air pressure is applied thereto when said arms are elevated, the ends of said tubular arms being directed out of said receptacle when such discharge air pressure is applied.

3. Apparatus as in claim 1 wherein spring means press said manifold disc into engagement with said carrier plate.

4. Apparatus for picking up and transferring light articles comprising an open topped receptacle for the articles,

- a frame, a support arm extending upwardly from said frame,
- a support shaft, said support shaft mounted on said support arm and extending downwardly toward said receptacle at an inclination to a vertical axis,
- a driven rotary center member in said receptacle to support articles therein, said center member being on a shaft that is not aligned with said support shaft,
- a driven rotary carrier plate attached to said support shaft,
- a plurality of tubular arms extending from circumferentially spaced portions of said carrier plate and with their ends being positioned for passing through a portion of said receptacle in one part of their rotary movement,
- said rotary member with said tubular arms thereon being positioned above said receptacle,
- a stationary manifold disc extending about said support shaft and having an axial face,
- said axial face abuttingly engaging said rotary plate,
- a support bar connected to said frame and pivotally attached to said manifold,
- a suction supply attached to said manifold, and
- an air pressure supply attached to another portion of said manifold so that as said carrier plate rotates, said arm ends are successively supplied with vacuum to engage and carry an article thereby and then with air pressure to positively discharge the article thereby.

5. Apparatus as in claim 4 wherein spring means and a rotary connection assembly press said manifold disc into engagement with said carrier plate and aid in engaging said carrier plate with said manifold disc.

* * * * *